(12) United States Patent
Andersson et al.

(10) Patent No.: US 12,527,474 B2
(45) Date of Patent: Jan. 20, 2026

(54) SYSTEM AND METHOD FOR DETERMINING REFERENCE GAZE DATA

(71) Applicant: Tobii AB, Danderyd (SE)

(72) Inventors: Henrik Andersson, Danderyd (SE); Deepak Akkil, Danderyd (SE)

(73) Assignee: Tobii AB, Danderyd (SE)

( * ) Notice: Subject to any disclaimer, the term of this patent is extended or adjusted under 35 U.S.C. 154(b) by 938 days.

(21) Appl. No.: 17/699,588

(22) Filed: Mar. 21, 2022

(65) Prior Publication Data
US 2022/0313082 A1    Oct. 6, 2022

(30) Foreign Application Priority Data
Mar. 30, 2021    (SE) .................................... 2150387-5

(51) Int. Cl.
*A61B 3/10*    (2006.01)
*A61B 3/00*    (2006.01)
(Continued)

(52) U.S. Cl.
CPC ............ *A61B 3/112* (2013.01); *A61B 3/0008* (2013.01); *A61B 3/0025* (2013.01); *A61B 3/14* (2013.01)

(58) Field of Classification Search
CPC ......... A61B 3/1015; A61B 3/02; A61B 3/102; A61B 3/1025; A61B 3/0075; A61B 3/113;
(Continued)

(56) References Cited

U.S. PATENT DOCUMENTS

2003/0086057 A1    5/2003  Cleveland
2012/0274905 A1*  11/2012  Johansson .............. A61B 3/024
                                                                        351/224
(Continued)

FOREIGN PATENT DOCUMENTS

EP    0631222 A1    12/1994
EP    3549525         10/2019
(Continued)

OTHER PUBLICATIONS

Swedish Search Report and Written Opinion of Swedish App. No. 2150387-5, Dated Nov. 22, 2021.
(Continued)

*Primary Examiner* — Dawayne Pinkney
(74) *Attorney, Agent, or Firm* — Christopher Ignatius Moylan (57) ABSTRACT

The invention is related to an eye tracking system for determining reference gaze data of a user in a scene exposing a pupil of the user. The eye tracking system comprising processing circuitry configured to obtain a first eye image comprising the pupil of the user, the first eye image being captured during a first time period; determine, based on the first eye image, a first pupil size; obtain a second eye image comprising the pupil of the user, the second eye image being captured during a second time period; determine, based on the second eye image, a second pupil size; obtain scene information of the scene exposing the pupil of the user, the scene information comprising at least the first luminance
(Continued)

level, the second luminance level and spatial information of the second region during the second time period; determine a pupil size change between the first pupil size and the second pupil size, the pupil size change indicating that the user is looking at the second region; determine reference gaze data of the user during the second time period, if the pupil size change is larger than a pupil size change threshold. The invention further relates to a head-mounted device, a method, a computer program and a carrier.

19 Claims, 8 Drawing Sheets

(51) Int. Cl.
  *A61B 3/02* (2006.01)
  *A61B 3/11* (2006.01)
  *A61B 3/113* (2006.01)
  *A61B 3/12* (2006.01)
  *A61B 3/14* (2006.01)
  *G02B 27/01* (2006.01)

(58) Field of Classification Search
  CPC ....... A61B 3/1225; A61B 3/024; G06T 11/60; A61F 13/53; G02B 27/0103; G02B 3/00; G02B 27/01; G02B 27/0093; G02B 27/017; G02B 2027/014; H04N 6/3179; H04N 3/3173; G06F 3/013

USPC ............... 351/210, 200, 205, 206, 208–209, 351/221–223, 246; 359/13, 618, 630
  See application file for complete search history.

(56) References Cited

U.S. PATENT DOCUMENTS

| | | |
|---|---|---|
| 2015/0199008 A1 | 7/2015 | Kim et al. |
| 2016/0131912 A1 | 5/2016 | Border et al. |
| 2016/0174335 A1* | 6/2016 | Park ................. H05B 47/105 315/77 |
| 2019/0076014 A1* | 3/2019 | Ryan .................... G06V 40/19 |
| 2022/0197377 A1* | 6/2022 | Kim ..................... G06V 40/18 |

FOREIGN PATENT DOCUMENTS

| | | |
|---|---|---|
| WO | 2011057161 | 5/2011 |
| WO | 2020159784 | 8/2020 |
| WO | 2020159784 A1 | 8/2020 |

OTHER PUBLICATIONS

Publication of patent application with search report regarding EP Appl. No. 22164315.8 published on Oct. 5, 2022.

* cited by examiner

SYSTEM AND METHOD FOR DETERMINING REFERENCE GAZE DATA

CROSS-REFERENCES TO RELATED APPLICATIONS

This application claims priority to Swedish Application No. 2150387-5, filed Mar. 30, 2021; the content of which are hereby incorporated by reference.

TECHNICAL FIELD

The present disclosure generally relates to the field of eye tracking. In particular, the present disclosure relates to systems and methods for determining reference gaze data of a user in a scene exposing a pupil of the user.

BACKGROUND ART

Eye/gaze tracking is the process of measuring the motion of an eye relative to the head, or the point of gaze. An eye tracker is a device for measuring eye positions and eye movement. Eye trackers are used in many different applications. Several different eye tracking systems are known in the art. Such systems may, for example, be employed to allow a user to indicate a location at a computer display by looking at that point. The eye tracking system may capture images of the user's face, and then employ image processing to extract key features from the user's face, such as a pupil center and potentially glints from illuminators illuminating the user's face. The extracted features may then be employed to determine where at the display the user is looking.

For a user to have an accurate and precise eye tracking experience the user needs to calibrate the eye tracker. This is typically done by looking at a given set of reference points for a certain amount of time and acquiring eye data of the user related to the gaze point or gaze ray of the user. The calibration can also take place continuously, while a user is using the eye tracker. Further, the user may want to interact with objects the user is looking at, by using his/her gaze. Also, gaze could be used to provide the user with an improved experience by implementing foveated rendering. For all the above purposes, it is important to be able to determine when the user is actually looking at the calibration target or the interactable object. Current solutions involve using an external input device, such as a mouse, keyboard, microphone or click button. Alternatively, a minimum amount of time gazing at the same target or determining a blink could be used as indications that the user is looking where intended. However, the external inputs are often slow and cumbersome for the user and if no external input is used the gaze determination may become less accurate.

Thus, there is a need to find a faster, less cumbersome and more accurate way to determine where the user is looking.

SUMMARY

According to a first aspect, there is provided an eye tracking system for determining reference gaze data of a user in a scene exposing a pupil of the user, the scene comprising at least a first region having a first luminance level and a second region having a second luminance level differing from the first luminance level by more than a luminance level threshold, the eye tracking system comprising processing circuitry configured to:

obtain a first eye image comprising the pupil of the user, the first eye image being captured during a first time period;
determine, based on the first eye image, a first pupil size;
obtain a second eye image comprising the pupil of the user, the second eye image being captured during a second time period;
determine, based on the second eye image, a second pupil size;
obtain scene information of the scene exposing the pupil of the user, the scene information comprising at least the first luminance level, the second luminance level and spatial information of the second region during the second time period;
determine a pupil size change between the first pupil size and the second pupil size, the pupil size change indicating that the user is looking at the second region;
determine reference gaze data of the user during the second time period, if the pupil size change is larger than a pupil size change threshold.

An effect of determining reference gaze data of the user based on the pupil size change, is that no external input is necessary to determine that a user is looking at the second region, while accuracy is still high. Thus, it is possible to determine that a user is looking at the second region without external inputs indicating where the user is looking. The reference gaze data may be used as input in a calibration process. In this example, a further advantage is that it is not needed to indicate when the user is looking at the first calibration point, since the eye tracking system only is determining reference gaze data when the user is looking at the second region, which in this example is the first calibration point. Further, the reference gaze data may be used for interaction with objects the user is looking at. Also in this example, the advantage is that reference gaze data will only be determined when the user is looking at the second region, which in this example is an interactable object. In a broader interpretation the gaze data may comprise a confirmation that the user is looking at the second region/interactable object. Further, the gaze data may comprise information of where the user is looking, such as a gaze point, gaze ray or point/area of attention. The reference gaze data may also be used for foveated rendering, i.e., rendering different parts of a display differently, depending on where the user is looking.

In one example, the processing circuitry is further configured to obtain the position of the pupil during the second time period; and wherein the determining of reference gaze data of the user is at least partly based on the obtained position of the pupil. In this example, the position of the pupil could be determined from the position of the pupil in the second eye image, but it could also be determined from other eye images or by other means for determining the position of the pupil during the second time period. In this example, the gaze data comprises information of where the user is looking, such as a gaze point, gaze ray or point/area of attention.

In a further example, the obtaining of the position of the pupil is at least partly based on the position of the pupil in the second eye image. Thus, the second eye image is used both for determining the pupil size change and for determining the reference gaze data. In this example, the gaze data comprises information of where the user is looking, such as a gaze point, gaze ray or point/area of attention.

In another example, the determining of reference gaze data of the user is at least partly based on the obtained scene information. By taking the scene information into account, it is possible to determine gaze data, such as a gaze point or a gaze ray, with higher accuracy, since the scene information comprises spatial information (such as position) of the second region during the second time period. Thus, if the position of the pupil indicates a gaze point/ray which does not coincide with the position of the second region, calibration may be performed based on the position of the second region. The reference gaze data may be set to coincide with the position of the second region. Alternatively, the reference gaze data may be set to coincide with a position between the position of the second region and a gaze point/ray indicated by the position of the pupil.

Further, the processing circuitry may be configured to link the reference gaze data to the second region based on the obtained scene information. Linking gaze position/ray to a region/object is called gaze to object mapping. Gaze to object mapping could be used to determine which object to interact with and/or if interaction with a certain object should be enabled or not.

Yet further, the processing circuitry may be configured to: determine a distance difference between the reference gaze data and the spatial information of the second region; and send an error signal to the user if the distance difference is above an error threshold. The error signal could indicate that something is wrong with the eye tracking system. For example, if the eye tracking system is comprised in a head-mounted device, the error signal may indicate that there is slippage of a head mounted device and that correction of the positioning of the head mounted device on the user's head is needed. In another example, there could be a hardware error of an eye image sensor or another component of the eye tracking system, such as the display or the position of the display in relation to the eye image sensor or the pupil of the user. There could also be an unexpected problem related to functionality of an illuminator of the eye tracking system or related to external illumination, which may cause unexpected reflections that can cause uncertainties in the determination of gaze data.

In a further example, the processing circuitry is further configured to update a gaze calibration setting of the user, based on the reference gaze data and the scene information. Thus, the reference gaze data may be set to coincide with a position between the position of the second region and a gaze point/ray indicated by the position of the pupil. Alternatively, the reference gaze data may be set to coincide with the position of the second region. In other words, the gaze calibration setting of the user is updated based on the knowledge that the user is looking at the second region when the reference gaze data is obtained.

In a yet further example, the reference gaze data comprises a gaze convergence depth and wherein the spatial information of the second region comprises depth information and wherein the updating of the gaze calibration setting of the user further comprises update the gaze convergence depth of the user based on the depth information. Thus, the reference gaze data may be set to coincide with a gaze convergence depth between the depth of the second region and the gaze convergence depth of the user. Alternatively, the gaze convergence depth may be set to the depth of the second region. In other words, the gaze calibration setting of the user is updated based on the knowledge that the user is looking at the second region when the gaze convergence depth is obtained.

In another example, the processing circuitry is further configured to: obtain a first total light level exposing the pupil of the user during the first time period; obtain a second total light level exposing the pupil of the user during the second time period; determine a total light level change between the first total light level and the second total light level; and only determine reference gaze data if the total light level change is smaller than a total light level change threshold. Thus, a check is introduced to verify that the pupil size change does not arise due to a change of the total light level exposing the pupil.

In yet another example, the processing circuitry is further configured to: obtain a first scene image exposing the pupil of the user during the first time period; obtain a second scene image exposing the pupil of the user during the second time period; determine a scene change between the first scene image and the second scene image; and only determine reference gaze data of the user if the scene change is smaller than a scene change threshold. Thus, a check is introduced to verify that the pupil size change does not arise due to a change of the scene image exposing the pupil.

In a further example, the processing circuitry is further configured to: determine, based on the first eye image, a first pupil position; determine, based on the second eye image, a second pupil position; determine a pupil position change between the first pupil position and the second pupil position; and only determine reference gaze data of the user if the pupil position change is larger than a pupil position change threshold. Thus, a check is introduced to verify that the pupil size change arises due to a pupil position change between the first time period and the second time period. If the scene exposing a pupil of the user remains identical or at least similar between the first time period and the second time period, a pupil position change is needed to cause a pupil size change due to local luminance level, i.e., where the user is looking, or perceived brightness level, rather than due to global luminance level, i.e., the total luminance level exposing the pupil.

Also, the reference gaze data may comprise at least one of a gaze point and a gaze ray. A gaze point is a 2D point on a surface, such as a 2D display. A gaze ray is a 3D ray from the eye/pupil of the user through a surface, such as a 2D display, or through a space, such as a 3D display or a semi-transparent display.

Further, the eye tracking system may comprise a display arranged to display at least a part of the scene exposing the pupil of the user. The display may be a 2D display arranged in a head-mounted device or remotely, i.e., not attached, to the user. The display may be any type of display, such as OLED or LED. Further, the display may be a 3D display arranged in a head-mounted device or remotely, i.e., not attached, to the user. Yet further, the display may be semi-transparent, such as displays for extended reality, XR, applications or non-transparent, such as standard desktop displays or displays for virtual reality, VR, applications.

Yet further, the eye tracking system may comprise an outward facing scene sensor arranged to obtain at least a part of the scene exposing the pupil of the user. By use of an outward facing scene sensor, it is possible to obtain information about the real world. Information about the real world is necessary in extended reality, XR, applications or in real world applications, where the eye tracking system does not comprise a display.

Also, the eye tracking system may comprise an eye image sensor arranged to capture the first eye image and the second eye image. Alternatively, the first eye image and the second eye image are captured by one or several external eye image sensors. In any case, the processing circuitry is configured to obtain the first eye image and the second eye image, either by retrieving the images from the eye image sensor of the eye tracking system or from one or several external eye image sensors.

Further, the eye tracking system may comprise at least one illuminator, wherein each illuminator is arranged to cause a glint in the eye of the user, the glint being detectable in the second eye image, wherein the determining of reference gaze data of the user is at least partly based on the position of the at least one glint in relation to the position of the pupil. This technique is called pupil center corneal reflection, PCCR, eye tracking, and is a well-known technique for improving the accuracy of gaze data determination.

According to a second aspect, there is provided a head-mounted device comprising an eye-tracking system for determining reference gaze data of a user in a scene exposing a pupil of the user, the scene comprising at least a first region having a first luminance level and a second region having a second luminance level differing from the first luminance level by more than a luminance level threshold, the eye tracking system comprising processing circuitry configured to:

obtain a first eye image comprising the pupil of the user, the first eye image being captured during a first time period;

determine, based on the first eye image, a first pupil size;

obtain a second eye image comprising the pupil of the user, the second eye image being captured during a second time period;

determine, based on the second eye image, a second pupil size;

obtain scene information of the scene exposing the pupil of the user, the scene information comprising at least the first luminance level, the second luminance level and spatial information of the second region during the second time period;

determine a pupil size change between the first pupil size and the second pupil size, the pupil size change indicating that the user is looking at the second region;

determine reference gaze data of the user during the second time period, if the pupil size change is larger than a pupil size change threshold.

The second aspect may include any additional features recited in relation to the first aspect.

According to a third aspect, there is provided a method, performed by an eye tracking system, for determining reference gaze data of a user in a scene exposing a pupil of the user, the scene comprising at least a first region having a first luminance level and a second region having a second luminance level differing from the first luminance level by more than a luminance level threshold, the method comprising the steps of:

obtaining a first eye image comprising the pupil of the user, the first eye image being captured during a first time period;

determining, based on the first eye image, a first pupil size;

obtaining a second eye image comprising the pupil of the user, the second eye image being captured during a second time period;

determining, based on the second eye image, a second pupil size;

obtaining scene information of the scene exposing the pupil of the user, the scene information comprising at least the first luminance level, the second luminance level and spatial information of the second region during the second time period;

determining a pupil size change between the first pupil size and the second pupil size, the pupil size change indicating that the user is looking at the second region;

determining reference gaze data of the user during the second time period, if the pupil size change is larger than a pupil size change threshold.

The third aspect may include any additional features recited in relation to the first aspect.

According to a fourth aspect, there is provided a computer program comprising computer readable code means to be run in an eye tracking system for determining reference gaze data of a user in a scene exposing a pupil of the user, the scene comprising at least a first region having a first luminance level and a second region having a second luminance level differing from the first luminance level by more than a luminance level threshold, which computer readable code means when run in the system causes the system to perform the following steps:

obtaining a first eye image comprising the pupil of the user, the first eye image being captured during a first time period;

determining, based on the first eye image, a first pupil size;

obtaining a second eye image comprising the pupil of the user, the second eye image being captured during a second time period;

determining, based on the second eye image, a second pupil size;

obtaining scene information of the scene exposing the pupil of the user, the scene information comprising at least the first luminance level, the second luminance level and spatial information of the second region during the second time period;

determining a pupil size change between the first pupil size and the second pupil size, the pupil size change indicating that the user is looking at the second region;

determining reference gaze data of the user during the second time period, if the pupil size change is larger than a pupil size change threshold.

The fourth aspect may include any additional features recited in relation to the first aspect.

According to a fifth aspect, there is provided a carrier comprising a computer program according to the fourth aspect.

BRIEF DESCRIPTION OF THE DRAWINGS

Specific embodiments will now be described in detail with reference to the accompanying drawings, in which.

DETAILED DESCRIPTION

The term "gaze data" should be interpreted broadly as data describing where a user is looking or at what object/region a user has his/her attention. In applications where it is enough to know the object/region of attention, gaze data may refer to that object or region. In applications where it is crucial to know to more precise where the user is looking, the gaze data may refer to a gaze point, i.e., a 2D point on a plane or display or a gaze ray or gaze vector, i.e., a 3D ray or vector extending from for example the eye, eyeball center or pupil through a gaze point on a plane or display. Further, the gaze data may also comprise information of the gaze convergence depth of the user, i.e., at what depth the user has his/her attention or focus and/or at what depth gaze rays of the left and right eyes coincides.

The term "reference gaze data" should be interpreted as gaze data determined based on pupil data and/or eye images obtained during a time period during which a pupil of the user is exposed to a local luminance level change or a perceived brightness level change. During those occasions, the pupil size change functions as an aid to determine what region or object the user is looking.

The term "luminance level" refers to a range of luminous or light intensities. This disclosure describes a first luminance level and a second luminance level. In the broadest definition, it is sufficient that there is a measurable difference between the first luminance level and the second luminance level. Further, the ranges of the first luminance level and the second luminance level may be separated by a luminous or light intensity range, such that there may be a safety margin between the ranges of luminous or light intensities of the first luminance level and the second luminance level.

The term "scene" should be interpreted as anything exposing the pupil of the user. The scene may comprise a display, or one display for each eye, exposing the pupil of the user. However, the scene may also comprise the real world exposing the pupil of the user.

The term "scene information" should be interpreted as information of anything exposing the pupil of the user. The scene information may include luminance or light levels of regions or objects exposing the pupil of the user. Further, the scene information may comprise spatial information, such as the position and/or size of regions or objects. The position may be interpreted as an x/y coordinate on a plane, surface or display. The scene information may further comprise depth information of the region or object in relative terms, as in relation to the pupil of the user or in absolute term, as a 3D position world space.

Figure 1:
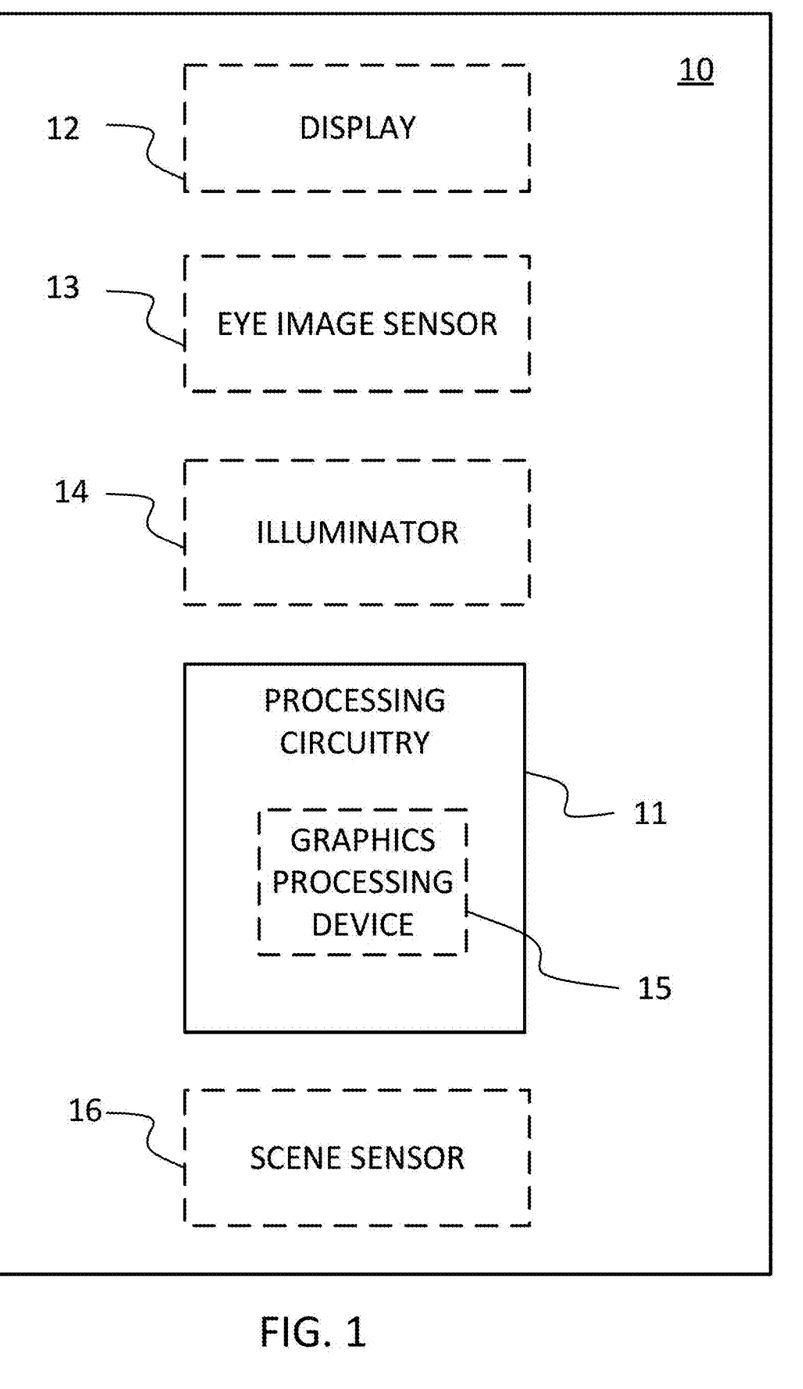
FIG. 1 is a block diagram of an eye tracking system.

FIG. 1 is a block diagram of an eye tracking system 10. The eye tracking system 10 is capable of determining gaze data of a user of the eye tracking system 10. An eye 100 of a user 230 is described in relation to FIGS. 2A and 2B. The eye tracking system 10 comprises processing circuitry 11 configured to process eye images and determine gaze data at least partly based on the gaze data. Further, the eye tracking system 10 may comprise a display 12. Yet further, the eye tracking system 10 may comprise an eye image sensor 13 arranged to capture eye images. Further, the eye image sensor 13 may be configured to determine the light level or luminance level exposing the user 230 or a pupil 102 of the user 230. The eye image sensor 13 may be any kind of imaging device. However, the eye tracking system 10 may also comprise a light sensor arranged to determine the light level or luminance level exposing the user 230 or a pupil 102 of the user 230. Yet further, the eye tracking system 10 may comprise at least one illuminator 14 illuminating at least one eye of the user. Yet further, the eye tracking system 10 may comprise a graphics processing device 15 configured to process graphics to be rendered, for example by the display 12. The display 12 may be any type of display, such as OLED or LED. Also, the graphics processing device 15 may be configured to determine the light level or luminance level of the display 12, which can be used to determine the light level or luminance level exposing the user 230 or a pupil 102 of the user 230. Further, the eye tracking system 10 may comprise an outward facing scene sensor 16 configured to capture information of the scene 20 exposing the user 230 and/or a pupil 102 of the user 230. The scene sensor 16 may be any kind of imaging device. By using an outward facing scene sensor 16 it is possible to obtain information about the real world. Information about the real world is necessary in extended reality, XR, applications or in real world applications, where the eye tracking system 10 does not comprise any display. The outward facing scene sensor 16 may be an image sensor, such as a camera, or a LIDAR based sensor, etc. Further, the outward facing scene sensor 16 may arranged to determine the light level or luminance level exposing the user 230 or a pupil 102 of the user 230.

Figure 2A:
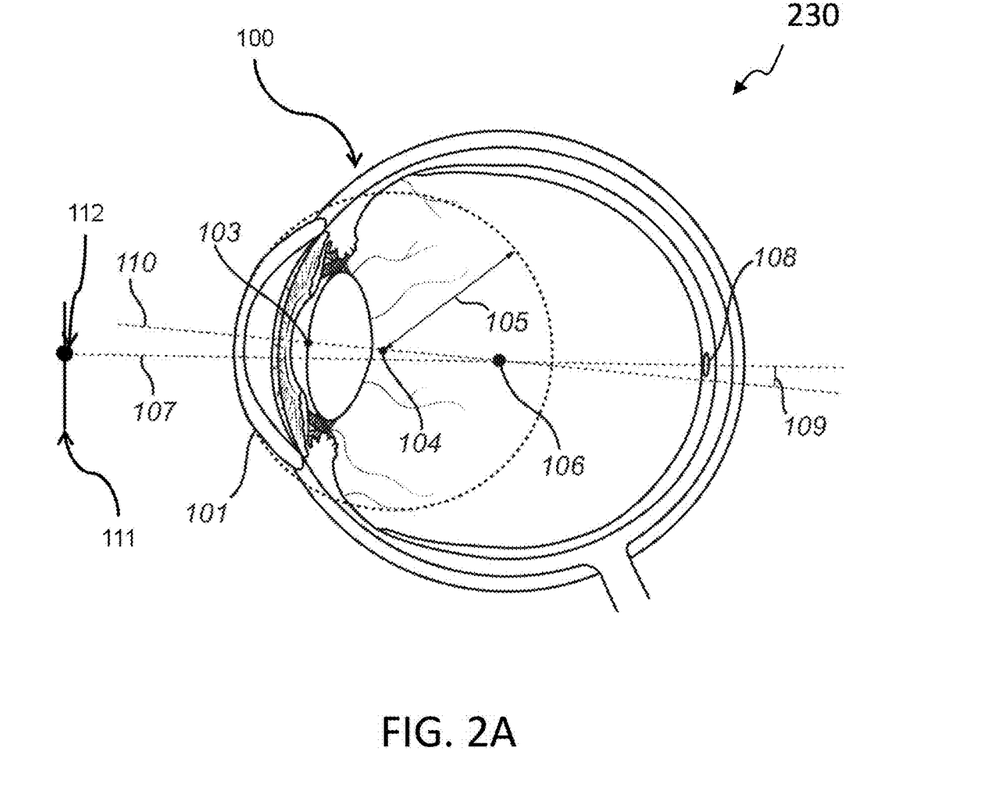
FIG. 2A shows a cross-sectional view of an eye of a user.

FIG. 2A shows a cross-sectional view of an eye 100 of a user 230 of the eye tracking system 10. The eye 100 has a cornea 101 and a pupil 102 with a pupil center 103. The cornea 101 is curved and has a center of curvature 104 which is referred as the center 104 of corneal curvature, or simply the cornea center 104. The cornea 101 has a radius of curvature referred to as the radius 105 of the cornea 101, or simply the cornea radius 105. The eye 100 has a center 106 which may also be referred to as the center 106 of the eyeball, or simply the eyeball center 106. The visual axis 107 of the eye 100 passes through the center 106 of the eye 100 to the fovea 108 of the eye 100. The optical axis 110 of the eye 100 passes through the pupil center 103 and the center 106 of the eye 100. The visual axis 107 forms an angle 109 relative to the optical axis 110. The deviation or offset between the visual axis 107 and the optical axis 110 is often referred to as the fovea offset 109. During calibration the eye tracking system 10, the fovea offset 109 may be determined for one or several gaze targets. In the example shown in FIG. 2A, the eye 100 is looking towards a display 111, and the eye 100 is gazing at a gaze point 112 at the display 111. The visual axis 107 may be referred to as a gaze ray passing through a point in the eye 100 and the gaze point 112. However, a combined gaze ray for left and right eyes may also be defined, which is passing through a point between the left and right eyes and the gaze point 112.

Figure 2B:
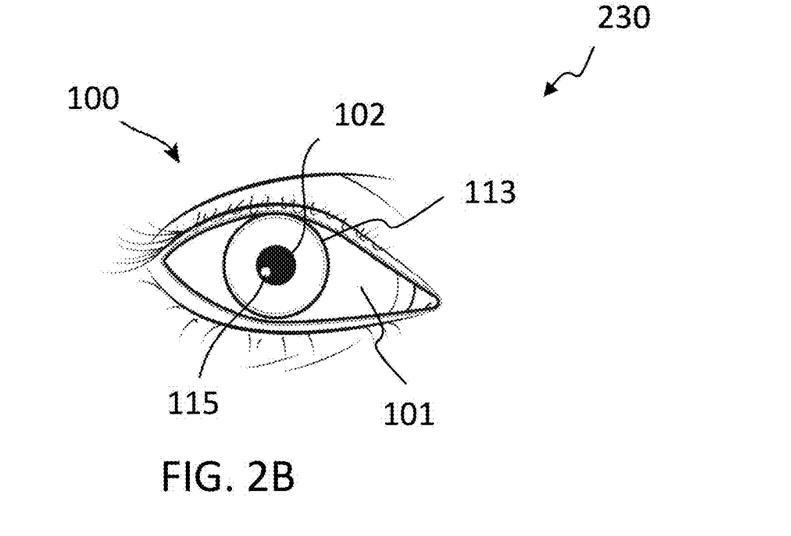
FIG. 2B shows an example of a front view of an eye of a user.

FIG. 2B shows an example of a front view of an eye 100 of a user 230 of the eye tracking system 10. FIG. 2B is an example of an eye image of the user 230. FIG. 2B discloses the eye 100, the cornea 101, a pupil 102 and an iris 113. Further, in this example the eye 100 has a reflection 115 at the cornea 101, the reflection 115 being caused by an illuminator 114. Such a reflection 115 is also known as a glint 115. The illuminator 114 can be any light source, such as a LED or laser. The processing circuitry 11 may for example employ image processing (such as digital image processing) for extracting features in the image. The processing circuitry 11 may for example employ pupil center cornea reflection, PCCR, eye tracking to determine where the eye 100 is looking. In PCCR eye tracking, the processing circuitry 11 estimates the position of the pupil 102 or the center 103 of the pupil 102 and the position of the glint 115 or the center of the glint 115 at the eye 100. The processing circuitry 11 calculates where the user is in space using the glint 115 and where the user's eye 100 is directed using the position of the pupil 102. Eye tracking may also be performed on the eye images without glints 115. Both for PCCR eye tracking and non-PCCR eye tracking, machine learning may be applied to increase accuracy of the gaze position estimation. Since there is typically an offset between the optical axis 110 and the visual axis 107, the processing circuitry 11 performs calibration of the fovea offset 109 to be able to determine where the user is looking. The gaze point 112 or gaze ray may be determined based on one eye 100 or both eyes of a user of the eye tracking system 10. If the latter, the gaze rays obtained from the left and right eyes, respectively, may be combined to form a combined estimated gaze point 112 or gaze ray.

Figure 3:
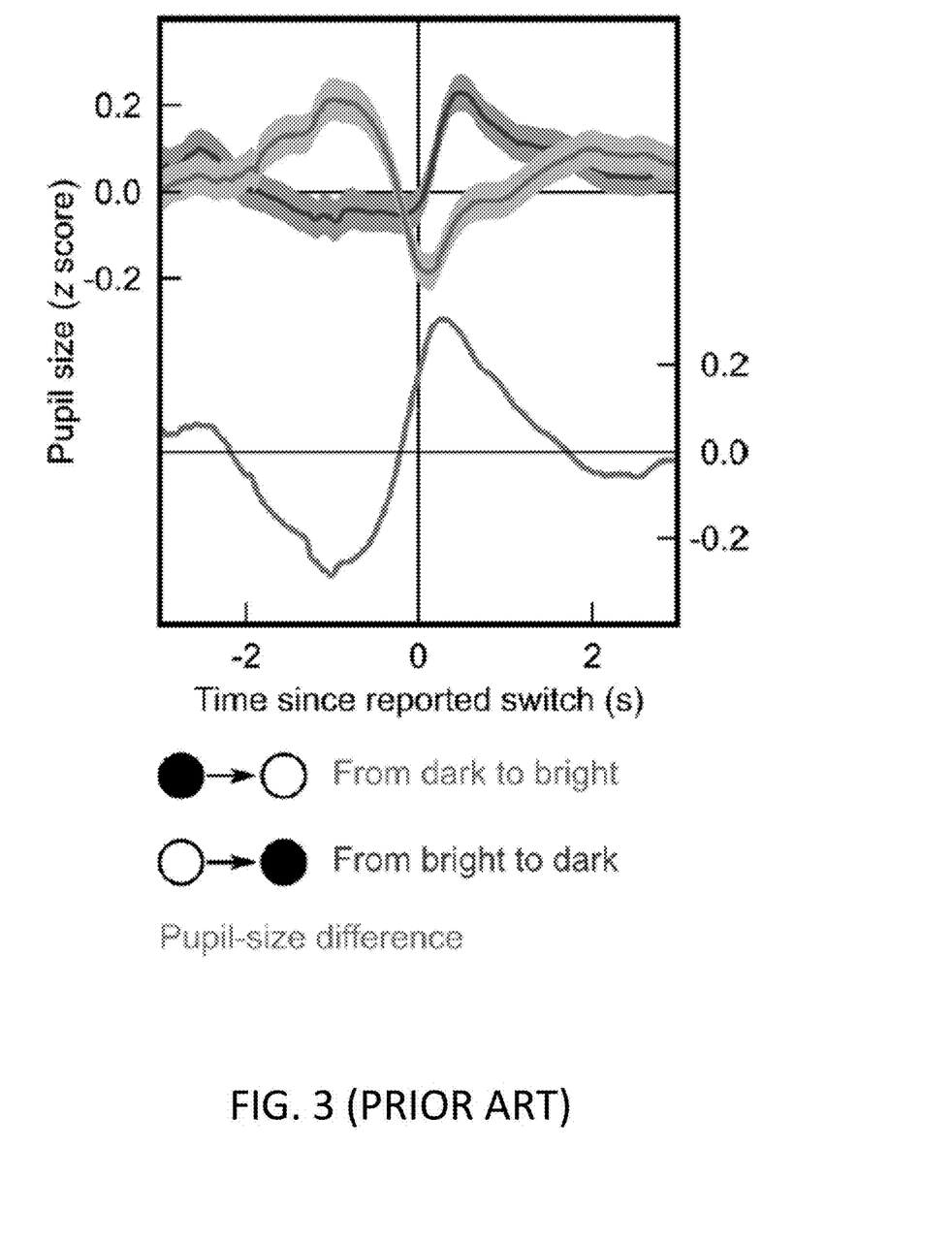
FIG. 3 illustrates the effect of visual awareness on the pupillary light response according to prior art.

A pupil is reacting to a lot of different stimuli, such as ambient light, changes in depth of focus, and cognitively triggered factors such as emotional arousal or cognitive load. However, the pupil does not only respond to global luminance changes, but also to local luminance level and perceived brightness level. Thus, when the user changes gaze from a dark object to a bright object in the same scene, the pupil constricts even before the gaze lands on the target. This is illustrated in FIG. 3, which can be found in the article "New Light on the Mind's Eye: The Pupillary Light Response as Active Vision", by Mathôt et al, from 2015. Mathôt et al. describes that the pupillary light response was historically considered a low-level reflex without any cognitive component. Recent studies that have dramatically changed this view are reviewed: The light response depends not only on a stimulus' brightness, but also on whether you are aware of the stimulus, whether you are paying attention to it, and even whether you are thinking about it. The authors highlight the link between the pupillary light response and eye-movement preparation: When you intend to look at a bright stimulus, a pupillary constriction is prepared along with the eye movement before the eyes set in motion. This preparation allows the pupil to rapidly change its size as your eyes move from bright to dark objects and back again. FIG. 3 shows the effect of visual awareness on the pupillary light response. When awareness switches from a dark stimulus to a bright stimulus the pupil constricts (brighter line). Conversely, when awareness switches from a bright to a dark stimulus, the pupil dilates (darker line). Error bands indicate standard error.

FIGS. 4-7 show different aspects of how to use the information that the pupil 102 changes due to local luminance level and perceived brightness level, to determine reference gaze data of the user 230. Gaze data in general may be obtained and/or determined with a much higher frequency. Just as an example, an eye tracker may determine gaze data 50 to 500 times per second. However, the term reference gaze data should be interpreted as gaze data determined based on pupil data and/or eye images obtained during a time period when a pupil of the user is exposed to a local luminance level change or a perceived brightness level change. During those occasions, the pupil size change functions as an aid to determine what region or object the user is looking.

The eye tracking system 10 is capable of determining reference gaze data of the user 230 of the eye tracking system 10. The processing circuitry 11 is configured to obtain eye images of the user 230 comprising a pupil 102 of the user 230. Further, the processing circuitry 11 is configured to determine, based on an eye image, a pupil size of the pupil 102 of the user 230. Yet further, the processing circuitry 11 is configured to obtain scene information of a scene 20 exposing the pupil 102 of the user 230. The scene 20 comprises at least a first region 30 having a first luminance level and a second region 40 having a second luminance level differing from the first luminance level by more than a luminance level threshold. The scene information of the scene 20 comprises at least the first luminance level, the second luminance level and spatial information of the second region 40 during a second time period. The scene 20 may comprise a display 12, or one display for each eye, exposing the pupil 102 of the user 230. However, the scene 20 may also comprise the real world exposing the pupil 102 of the user 230. In short, the scene 20 may comprise anything exposing the pupil 102 of the user 230. The second time period represents a time period when the user 230 has switch focus from the first region 30 to the second region 40 and thus the user 230 has been exposed to local luminance level change. Further, the processing circuitry 11 is configured to determine a pupil size change between the first pupil size and the second pupil size. The pupil size change indicates that the user 230 is looking at the second region 40. Yet further, the processing circuitry 11 is configured to determine reference gaze data of the user 230 during the second time period, if the pupil size change is larger than a pupil size change threshold.

The pupil size may be defined in radius, diameter and/or area of the pupil. Further, the pupil size may be determined in relative terms, such as radius, diameter and/or area of the pupil 102 in the eye images. Alternatively, the pupil size may be determined in absolute terms, such as the actual radius, diameter and/or area of the pupil 102. The pupil size change threshold may relate to any of the above definitions. No reference gaze data is determined if the pupil size change is lower than the pupil size change threshold.

In one example, the processing circuitry 11 is configured to obtain the position of the pupil during the second time period $t_2$ and that the determining of reference gaze data of the user 230 is at least partly based on the obtained position of the pupil 102. It is not necessary that the position of the pupil 102 has been determined from one of the eye images. It is also possible that the position of the pupil 102 during the second time period $t_2$ has been obtained in another way. One option is that the coordinates of the position of the pupil 102 during the second time period $t_2$ have been obtained by the processing circuitry 11. Another option is that another eye image captured during the second time period $t_2$ is used to obtain the position of the pupil 102 during the second time period $t_2$.

In the example below a first time period $t_1$ and a second time period $t_2$ is described. The first time period $t_1$ takes place before the pupil size change and the second time period $t_2$ takes place after the pupil size change. Thus, the second time period $t_2$ is after the first time period $t_1$. In one example, the second time period $t_2$ comes directly after the first time period $t_1$. In another example, there is a time gap between first time period $t_1$ and second time period $t_2$. Each of the of the first time period $t_1$ and second time period $t_2$ may have any length of time. In one example the first time period $t_1$ and second time period $t_2$ is the inverse of the frequency of the eye tracker, i.e., each of the first time period $t_1$ and second time period $t_2$ comprises only one eye image. However, each of the first time period $t_1$ and second time period $t_2$ may comprise of several consecutive eye images, wherein each of first eye image 35 and second eye image 45 is only one eye image within the consecutive eye images within that time period. It is also possible that each of first eye image 35 and second eye image 45 represents a merge of plurality of eye images within the respective time period. Each of the first and second time periods may be anything from milliseconds to seconds long.

Figure 4A:
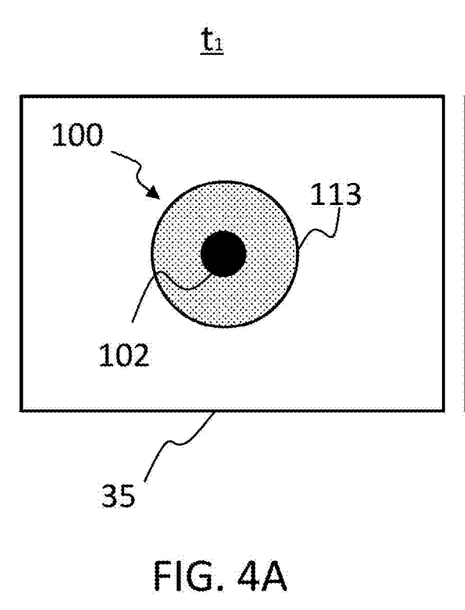
FIGS. 4A and 4B show examples of eye images captured during two different time periods, wherein the pupil position is neglected.
Figure 4B:
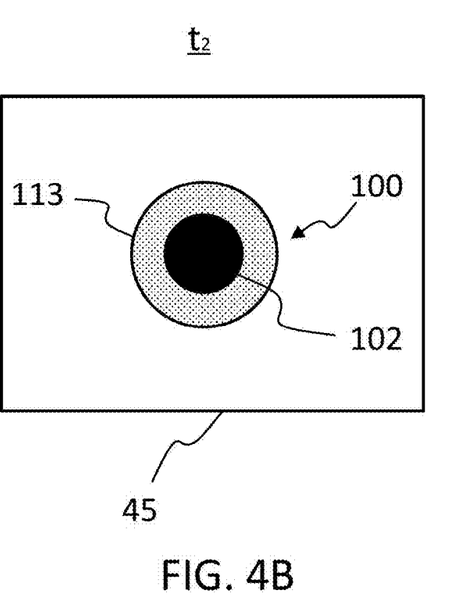

FIGS. 4A and 4B show examples of eye images 35, 45 during two different time periods, wherein the pupil position is neglected. Further, FIG. 4A shows a first eye image 35 of an eye 100 of the user 230, captured during a first time period $t_1$. The first eye image 35 of the eye 100 comprises a pupil 102 of the user 230. The first eye image 35 may also comprise an iris 113 of the eye 100. Since the size of the iris 113 is constant, the iris 113 facilitates the determination of the pupil size. As can be seen, the first eye image 35 does not comprise any other eye features. This is to illustrate that in the broadest embodiment of the invention, it is not necessary to determine a pupil position of the first eye image 35. Rather, it is enough to determine, based on the first eye image 35, a first pupil size.

FIG. 4B shows a second eye image 45 of an eye 100 of the user 230, captured during a second time period $t_2$. The second time period $t_2$ is after the first time period $t_1$. Also, the second eye image 45 of the eye 100 comprises a pupil 102 of the user 230. Further, the second eye image 45 may also comprise an iris 113 of the eye 100. As can be seen, also the second eye image 45 does not comprise any other eye features. This is to illustrate that in the broadest embodiment of the invention, it is not necessary to determine a pupil position of the second eye image 45. Rather, it is enough to determine, based on the second eye image 45, a second pupil size.

Figure 4C:
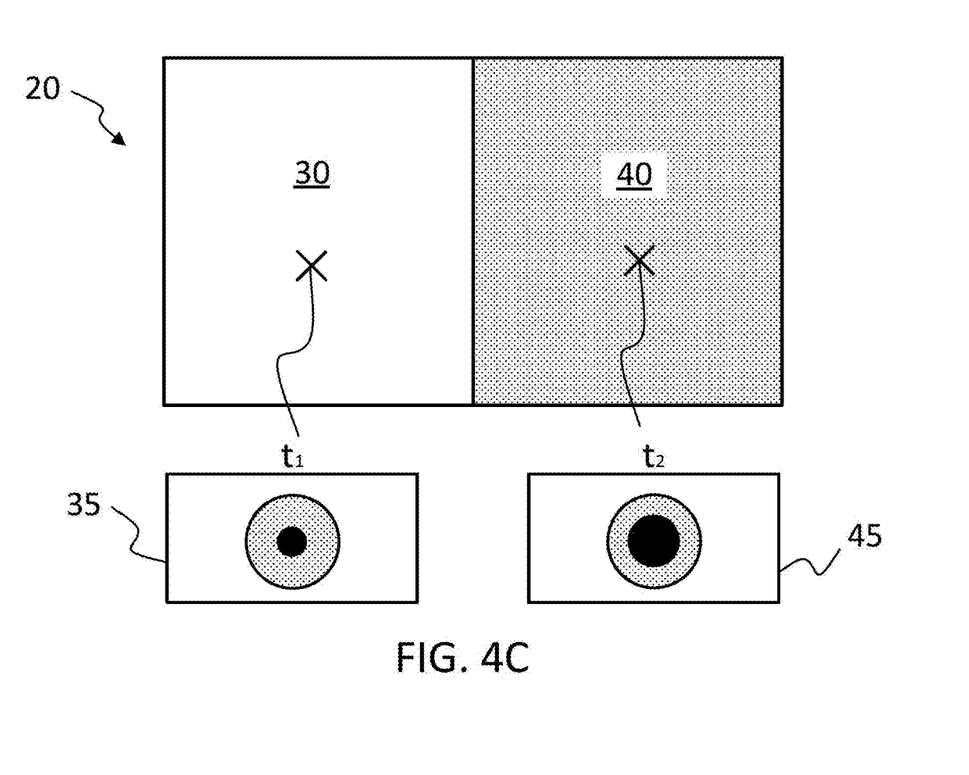
FIG. 4C shows how the eye images of FIGS. 4A and 4B relate to a scene comprising two regions.

FIG. 4C shows how the first and second eye images 35, 45 of FIGS. 4A and 46 relate to a scene 20 comprising two regions during the two different time periods. As described above, the scene 20 comprises at least a first region 30 having a first luminance level and a second region 40 having a second luminance level differing from the first luminance level by more than a luminance level threshold. In this example, the second region 40 is the right half of the scene 20 and the first region 30 is the left half of the scene. However, each of the first region 30 and the second region 40 may have any other shape and/or size. However, if the second region 40 is used for calibration purposes, it is advantageous that the second region 40 is small in size or have an indication in the centre of the second region 40, so that that it is possible to assume with high probability, where the user is looking when the pupil size changes. In this example, the scene 20 is constant during the first and second time periods $t_1$, $t_2$. That is, the first and second regions 30, 40 do not change during the first and second time periods $t_1$, $t_2$. Further, the first luminance level is higher than the second luminance level. Since the local luminance level is lower in the second region 40 compared to the first region 30, the pupil size will increase when the user 230 is looking at the second region 40 after looking at the first region 30. Thus, just by looking at the pupil size of the user 230, it is possible to determine if the user 230 is looking at the first region 30, which is brighter, or the second 40 region, which is darker. Since the pupil size is larger during the second time period $t_2$, it is apparent that the user is looking at the second region 40, which is darker, during the second time period $t_2$. It can further be assumed that the user 230 was looking at the first region 30, which is brighter, during the first time period $t_1$. Thus, the reference gaze data may be set to be a gaze point within the second region 40. Further, the reference gaze data may be set to be a gaze ray extending through the second region 40. Thus, in both cases, the determining of reference gaze data of the user is at least partly based on the obtained scene information. The obtained scene information is in this case represented by the position of the second region 40. Further, the reference gaze data is linked to the second region based on the obtained scene information, since no additional gaze point or gaze ray is determined based on pupil positions in the eye images. This information could be used to interact with the second region 40 or an object within the second region 40. Linking gaze position/ray to a region/object is called gaze to object mapping.

In the above example, the first luminance level is higher than the second luminance level. However, the opposite may also apply, i.e., if the first luminance level is lower than the second luminance level, the pupil size will decrease when the user 230 is looking at the second region 40 after looking at the first region 30.

Figure 5A:
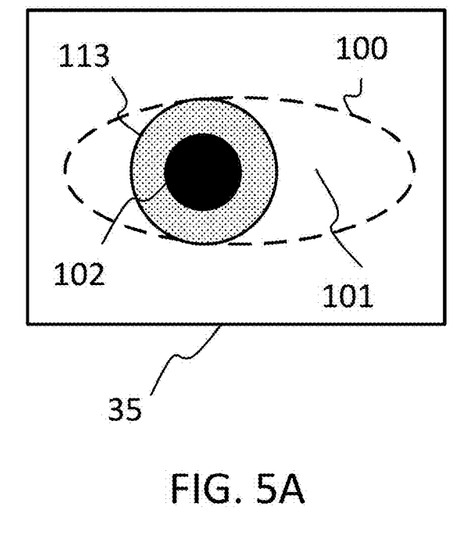
FIGS. 5A and 5B show examples of eye images captured during two different time periods, wherein the pupil position is taken into account.
Figure 5B:
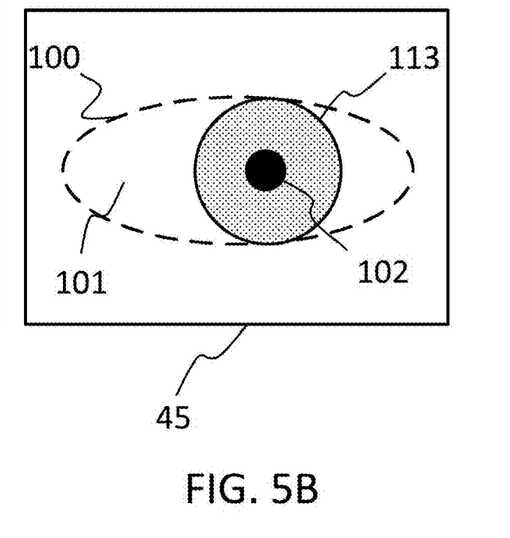

FIGS. 5A and 5B show examples of eye images 35, 45 during two different time periods, wherein the pupil position is taken into account. Just as for FIG. 4A above, FIG. 5A shows a first eye image 35 of an eye 100 of the user 230, captured during a first time period $t_1$. The first eye image 35 of the eye 100 comprises a pupil 102 of the user 230. The first eye image 35 may also comprise an iris 113 of the eye 100. Since the size of the iris 113 is constant, the iris 113 facilitates the determination of the pupil size. Additionally, FIG. 5A shows other details of the eye 100, such that it is possible to determine a gaze point or a gaze ray based on the first eye image 35. Further, based on the first eye image 35, a first pupil size can be determined.

Further, as for FIG. 48 above, FIG. 5B shows a second eye image 45 of an eye 100 of the user 230, captured during a second time period $t_2$. The second time period $t_2$ is after the first time period $t_1$. Also, the second eye image 45 of the eye 100 comprises a pupil 102 of the user 230. Further, the second eye image 45 may also comprise an iris 113 of the eye 100. Additionally, FIG. 5B shows other details of the eye 100, such that it is possible to determine a gaze point or a gaze ray based on the second eye image 45. Further, based on the second eye image 45, a second pupil size can be determined.

Figure 5C:
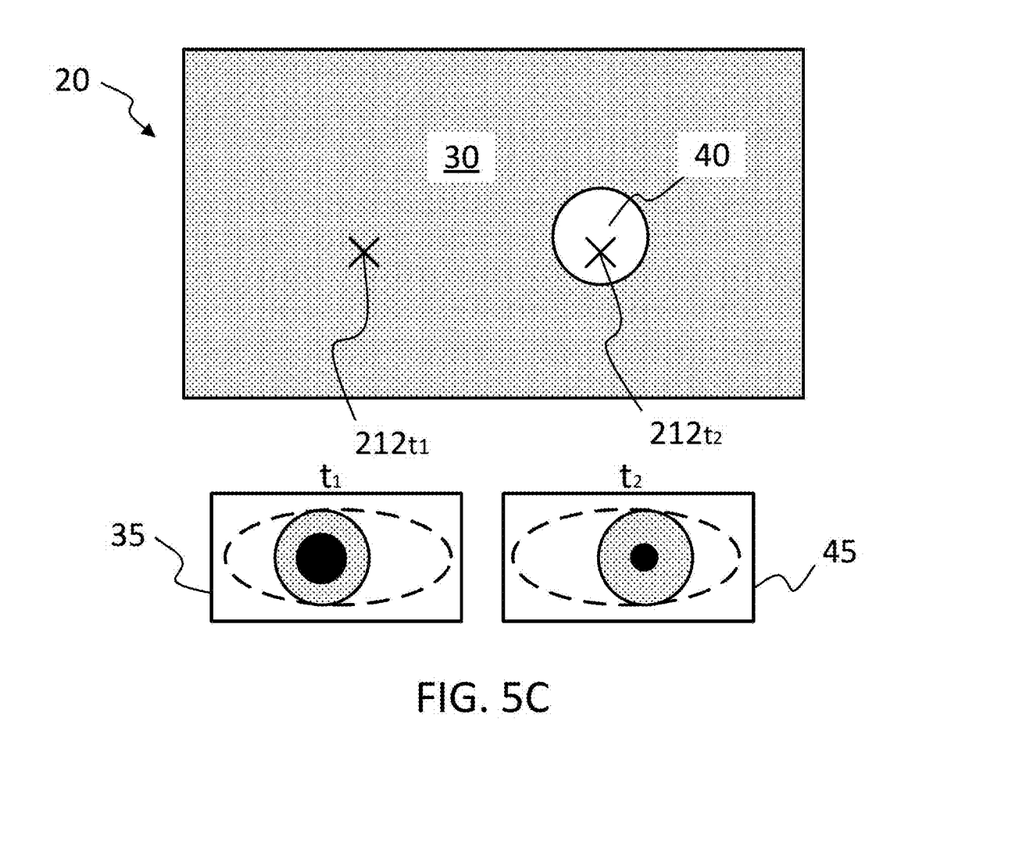
FIG. 5C shows how the eye images of FIGS. 5A and 5B relate to a scene comprising two regions.

Further, FIG. 5C shows how the eye images of FIGS. 5A and 5B relate to a scene 20 comprising two regions during the two different time periods. Like FIG. 4C, FIG. 5C shows how the first and second eye images 35, 45, in this case of FIGS. 5A and 58, relate to a scene 20 comprising two regions during the two different time periods. As described above, the scene 20 comprises at least a first region 30 having a first luminance level and a second region 40 having a second luminance level differing from the first luminance level by more than a luminance level threshold. In this example, the second region 40 is a smaller region illustrated with a circle or a dot. However, the second region 40 may have any other shape and/or size. However, if the second region 40 is used for calibration purposes, it is advantageous that the second region 40 is small or have an indication in the centre of the second region 40, so that that it is possible to assume with high probability, where the user is looking when the pupil size changes. In this example, the scene 20 is constant during the first and second time periods $t_1$, $t_2$. That is, the first and second regions 30, 40 do not change during the first and second time periods $t_1$, $t_2$. Further, the first luminance level is lower than the second luminance level. Since the local luminance level is higher in the second region 40 compared to the first region 30, the pupil size will decrease when the user 230 is looking at the second region 40 after looking at the first region 30. Thus, just by looking at the pupil size of the user 230, it is possible to determine if the user 230 is switching the attention, i.e., the gaze, to the second region 40, which is brighter. Since the pupil size is smaller during the second time period $t_2$, it is apparent that the user is looking at the second region 40. It can further be assumed that the user 230 was looking at the first region 30, which is brighter, during the first time period $t_1$.

Further, since FIGS. 5A and 5B comprise additional information regarding pupil position in relation to other features in or around the eye 100, it is possible determine a gaze point or gaze ray in the scene 20 based on the first and second eye images 35, 45 respectively. That is, based on the first eye image 35, a first gaze point $212_{t1}$ or a first gaze ray passing through the first gaze point $212_{t1}$ may be determined. Further, based on the second eye image 45, a second gaze point $212_{t2}$ or a second gaze ray passing through the second gaze point $212_{t2}$ may be determined. The eye images may include the cornea 101 and/or the whole eye 100 and/or even other face features, such as eyelash, eyebrow or nose, which features makes it possible to determine that the pupil 102 has moved. However, if the eye images are captured from a fixed position in relation to the eye, it may be enough to track the position of the eye 102 to determine a gaze point 212 or a gaze ray. Further, there are different ways of improving the determining of reference gaze data, such as a gaze point 212 or gaze ray, additionally based on machine learning and/or glint(s) 115. Further, a 3D model may be used to determine gaze point 212 or gaze ray based on each of the eye images 35, 45. However, details of the different ways of determining gaze data based on eye images will not be presented herein. Rather, the explanation herein will be kept on a higher level. By comparing first and second eye images 35, 45 of FIGS. 5A to 5C, it is apparent that not only the pupil size has changed, but also that the pupil position within the eye 100 has changed towards the right. Thus, additionally to determining that the pupil size has changed, in this case the pupil 102 has become smaller, it is apparent that the user 230 is looking further to the right in the scene 20, where the second region 40, which is brighter, is present. This reference gaze data conforms with that the user is looking at the second region 40 during the second time period $t_2$. However, the reference gaze data is not only used to confirm that the user is actually looking at the second region 40.

The reference gaze data may be based on gaze data determined from the second eye image 45. However, the reference gaze data may also be based on other data, such as an average of earlier and/or later gaze data obtained from eye images captured during the second time period $t_2$. Yet further, the reference gaze data may be based on the position of the second region 40 during the second time period $t_2$.

For example, the processing circuitry 11 may further be configured to link the reference gaze data to the second region based on the obtained scene information. That is, if it is determined by the reference gaze data from the position of the pupil 102 in the second eye image 45, that the gaze point is at the second region 40 or the gaze ray coincides with the second region 40, the user may interact with the second region 40 or an object within the second region 40.

In another example, the processing circuitry 11 may further be configured to determine a distance difference between the reference gaze data and the position of the second region 40 and send an error signal to the user if the distance difference is above an error threshold. The error signal could indicate that something is wrong with eye tracking system 10. For example, if the eye tracking system 10 is comprised in a head-mounted device, the error signal may indicate that there is slippage of a head mounted device and that correction is needed. In another example, there could be a hardware error of for example an eye image sensor 13 or another component of the eye tracking system 10, such as the display 12 or the position of the display 12 in relation to the eye image sensor 13 or the pupil 102 of the user 230. There could also be an unexpected problem related to functionality of an illuminator 14 of the eye tracking system 10 or related to external illumination, which may cause unexpected reflections that can cause uncertainties in the determination of gaze data.

In yet another example, the processing circuitry 11 is further configured to update a gaze calibration setting of the user 230, based on the reference gaze data and the scene information. In this case, the position of second region 40 may be used to update a gaze calibration setting of the user 230. Thus, the reference gaze data may be set to coincide with a position between the position of the second region 40 and a gaze point/ray indicated by the position of the pupil. Alternatively, the reference gaze data may be set to coincide with the position of the second region 40. In other words, a gaze calibration setting of the user is updated based on the knowledge that the user is looking at the second region 40 when the reference gaze data is obtained.

Figure 6:
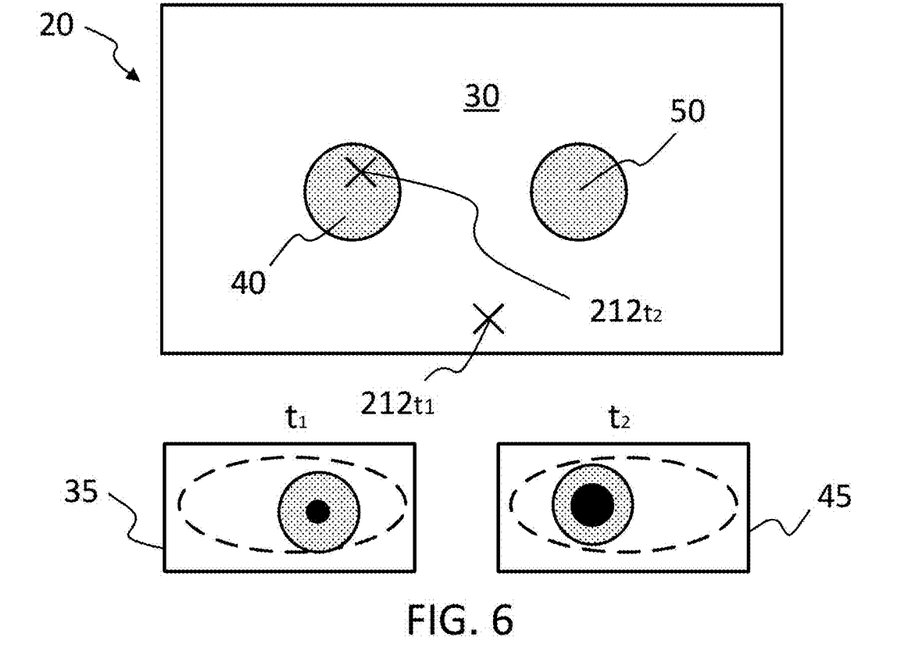
FIG. 6 shows an example of eye images captured during two different time periods and how the eye images relate to a scene comprising three regions.

FIG. 6 shows an example of first and second eye images 35, 45 during first and second time periods $t_1$, $t_2$ and how the first and second eye images 35, 45 relate to a scene 20 comprising three regions. This example is similar to the example explained by FIGS. 5A to 5C. However, FIG. 5 additionally comprises a third region 50 having the same luminance level as the second region 40, i.e., having the second luminance level. Further, in this example the first luminance level is higher than the second luminance level (thus, opposite of FIG. 5C). Since the local luminance level is lower in the second region 40 and in the third region 50 compared to the first region 30, the pupil size will increase when the user 230 is looking at the second region 40 or the third region 50 after looking at the first region 30. Since the scene 20 comprises several regions within the second luminance level, in addition to determine an increase in pupil size, gaze data obtained from the second eye image 45 is needed in order to determine if the user 230 is looking at the second region 40 or the third region 50. That is, based on the first eye image 35, a first gaze point $212t_1$ or a first gaze ray passing through the first gaze point $212t_1$ may be determined. Further, based on the second eye image 45, a second gaze point $212t_2$ or the second gaze ray passing through the second gaze point $212t_2$ may be determined. In this case, based on the second gaze point $212t_2$ or the second gaze ray passing through the second gaze point $212t_2$ and the increase in pupil size, the processing circuitry is configured to determine that the user is looking at the second region 40.

In the above-described examples related to FIGS. 4A-6, the scene 20 is constant during the first and second time periods $t_1$, $t_2$, and thus the total illumination is the same during the first and second time periods $t_1$, $t_2$. Hence, the pupil size is not affected by anything else than the local luminance level/the perceived brightness level. This is typical in virtual reality, VR, applications using a head mounted device, where no external light enters the field-of-view or scene 20 exposing the user. Thus, it is possible to control the total illumination level. Especially, during calibration procedures it is easy to keep the total illumination level constant.

However, in applications where the total light level exposing the pupil of the user is shifting over time, it may be advantageously to introduce one or several checks to make sure that the pupil 102 changes size due to a change in local luminance level, rather than due to a change in global luminance level i.e., the total luminance level exposing the pupil 102. This could be important in applications where surrounding light from the real world enters the field-of-view or scene 20 exposing the user, or in applications where the total illumination level of a display changes over time.

In one example, the processing circuitry 11 is further configured to: obtain a first total light level exposing the pupil 102 of the user during the first time period $t_1$; obtain a second total light level exposing the pupil 102 of the user 230 during the second time period $t_2$; determine a total light level change between the first total light level and the second total light level; and only determine reference gaze data if the total light level change is smaller than a total light level change threshold. Thus, a check is introduced to verify that the pupil size change does not arise due to a change of the total light level exposing the pupil.

In another example, the processing circuitry 11 is further configured to: obtain a first scene image exposing the pupil of the user during the first time period $t_1$; obtain a second scene image exposing the pupil of the user during the second time period $t_2$; determine a scene change between the first scene image and the second scene image; and only determine reference gaze data of the user if the scene change is smaller than a scene change threshold. Thus, a check is introduced to verify that the pupil size change does not arise due to a change of the scene image exposing the pupil.

In a further example, the processing circuitry 11 is further configured to: determine, based on the first eye image 35, a first pupil position; determine, based on the second eye image 45, a second pupil position; determine a pupil position change between the first pupil position and the second pupil position; and only determine reference gaze data of the user if the pupil position change is larger than a pupil position change threshold. Thus, a check is introduced to verify that the pupil size change arises due to a pupil position change between the first time period $t_1$ and the second time period $t_2$. If the scene 20 exposing a pupil of the user remains identical or at least similar between the first time period and the second time period, a pupil position change is needed to cause a pupil size change due to local luminance level, i.e., where the user is looking, or perceived brightness level, rather than due global luminance level.

Figure 7:
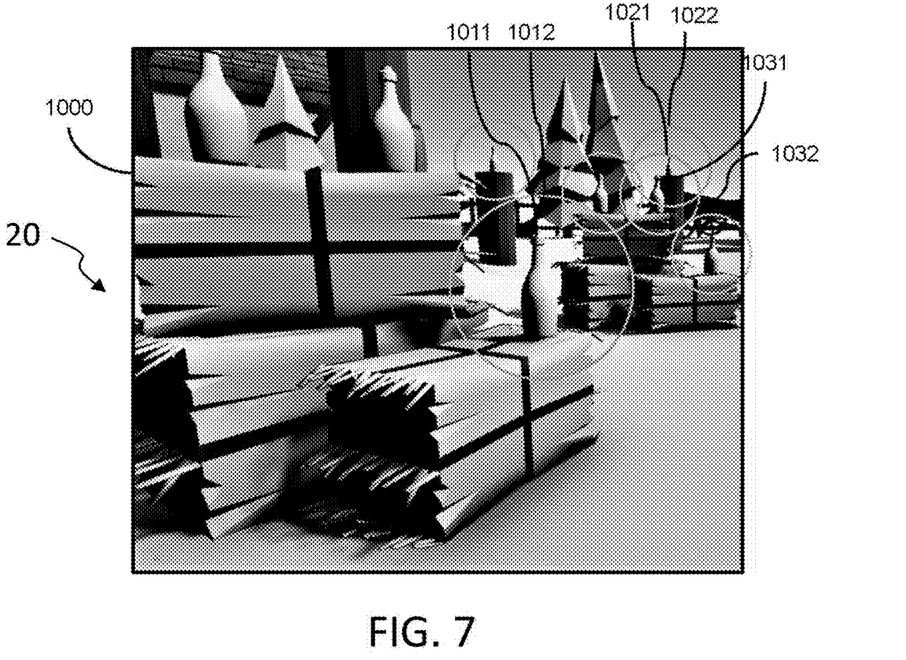
FIG. 7 shows an example of a 3D visualization comprising a plurality of objects at different depths.

FIG. 7 illustrates a scene 20 comprising a plurality of objects 1011, 1021, 1031 rendered by a 3D display 1000, wherein the objects 1011, 1021, 1031 are positioned at different depths. The visualization of objects by the 3D display 1000 depicts a scene 20 with bottles placed on various other objects or items. In one example, the 3D position of an object is converted to a position in a display for the left eye using a first projection and converted to a position in a second display for the left eye using a second projection, thereby visualizing the object in 3D to the user 230. An object 1011 of the visualized objects 1011, 1021, 1031 at which a user is watching is determined based the method and eye tracking system 10 described above. In this example, it may be determined that, after a pupil size change, the user 230 is watching a bottle 1011, which in this example corresponds to the second region 40. Thus, gaze to object mapping is performed. A gaze convergence depth indicative of a depth the user is watching at is then obtained. The gaze convergence depth can be determined by comparing the pupil position of the left and right eye. For example, by comparing a current interpupillary distance, IPD, between the left and right eyes, with an interocular distance, IOD, defined as when the user is looking at infinity, the gaze convergence depth can be obtained. An object depth is then obtained based on the 3D position of the determined object 1011. An updated gaze convergence depth is then calculated using the obtained gaze convergence depth and the object depth of the, i.e., by updating the obtained gaze convergence depth with the object depth or a value between the obtained gaze convergence depth and the object depth. Thus, in this case the reference gaze data comprises a gaze convergence depth and the spatial information of the second region 40 comprises depth information.

Further, the updating of the gaze calibration setting of the user 230 further comprises to update the gaze convergence depth of the user based on the depth information. Thus, the reference gaze data may be set to coincide with a gaze convergence depth between the depth of the second region 40 and the gaze convergence depth of the user. Alternatively, the gaze convergence depth may be set to coincide with the depth of the second region 40. In other words, a gaze calibration setting of the user is updated based on the knowledge that the user is looking at the second region 40 when the gaze convergence depth is obtained.

Figure 8:
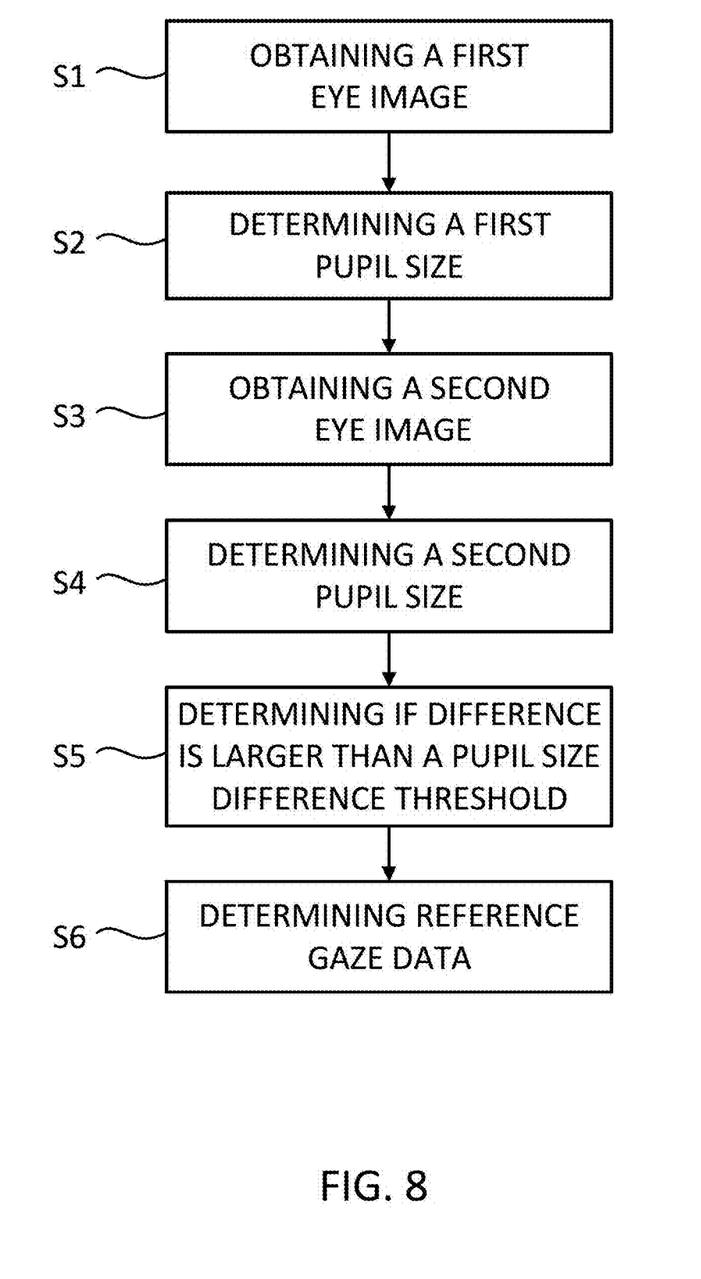
FIG. 8 illustrates a method for determining reference gaze data of a user.

FIG. 8 shows a method, performed by an eye tracking system 10, for determining reference gaze data of a user 230 in a scene 20 exposing a pupil 102 of the user. The scene 20 comprises at least a first region 30 having a first luminance level and a second region 40 having a second luminance level differing from the first luminance level by more than a luminance level threshold. The method comprises the steps of:

- obtaining S1 a first eye image 35 comprising the pupil 102 of the user 230, the first eye image 35 being captured during a first time period $t_1$;
- determining S2, based on the first eye image 35, a first pupil size;
- obtaining S3 a second eye image 45 comprising the pupil 102 of the user 230, the second eye image 45 being captured during a second time period $t_2$;
- determining S4, based on the second eye image 45, a second pupil size;
- obtaining S5 scene information of the scene exposing the pupil 102 of the user 230, the scene information comprising at least the first luminance level, the second luminance level and spatial information of the second region 40 during the second time period $t_2$;
- determining S6 a pupil size change between the first pupil size and the second pupil size, the pupil size change indicating that the user 230 is looking at the second region 40;
- determining reference gaze data of the user 230 during the second time period $t_2$, if the pupil size change is larger than a pupil size change threshold.

Further, the method may comprise any additional step performed by the eye tracking system 10 that the eye tracking system 10 is capable of performing, as disclosed in this description.

Figure 9A:
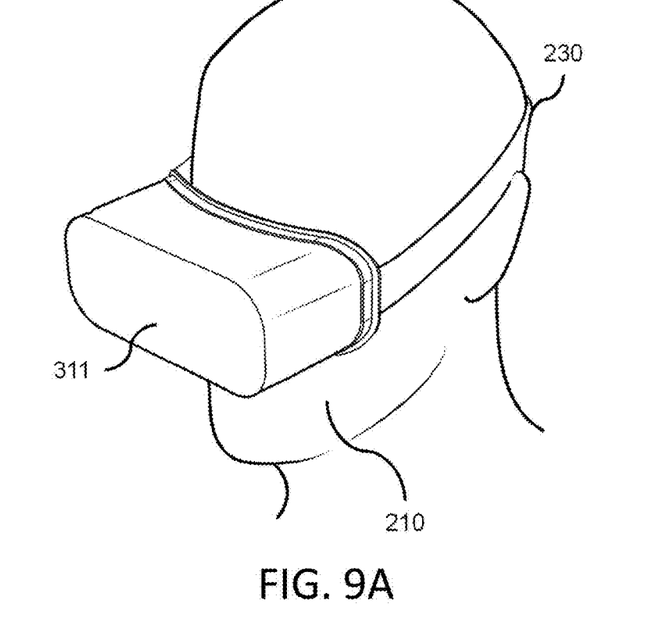
FIG. 9A shows a head-mounted device according to one or more embodiments.

FIG. 9A shows a head-mounted device 210 according to one or more embodiments. The head-mounted device 210, is a device which may optionally be adapted to be mounted (or arranged) at the head of the user 230, as shown in FIG. 9A. The head-mounted device 210 may e.g., comprise and/or be comprised in a head-mounted display, HMD, such as a virtual reality, VR, headset, an augmented reality, AR, headset or a mixed reality, MR, headset. The head-mounted device 210 may comprise all or a subset of features of the eye tracking system 10 described in relation to FIG. 1. The head-mounted device 210 or head-mounted display, HMD, comprises a 3D display 311, which can visualize a plurality of objects 1011, 1021, 1031 in response to a control signal received from a computer. The head-mounted device 210 is typically further configured to provide gaze data using one or more eye image sensors 13, e.g., indicative of a gaze point and/or a convergence distance. In other words, the head-mounted device 210 is configured to provide an indication of an object or a region the user 230 is looking at and/or a depth at which the user 230 is looking/watching.

The 3D display 311 may for example be a stereoscopic display. The 3D display 311 may for example be comprised glasses equipped with AR functionality. Further, the 3D display 311 may be a volumetric 3D display, being either autostereoscopic or automultiscopic, which may indicate that they create 3D imagery visible to an unaided eye, without requiring stereo goggles or stereo head-mounted displays. Consequently, as described in relation to FIG. 9A, the 3D display 311 may be part of the head-mounted device 210. However, the 3D display 311 may also be a remote display, which does not require stereo goggles or stereo head-mounted displays. In a third example, the 3D display 311 is a remote display, where stereoscopic glasses are needed to visualize the 3D effect to the user.

Figure 9B:
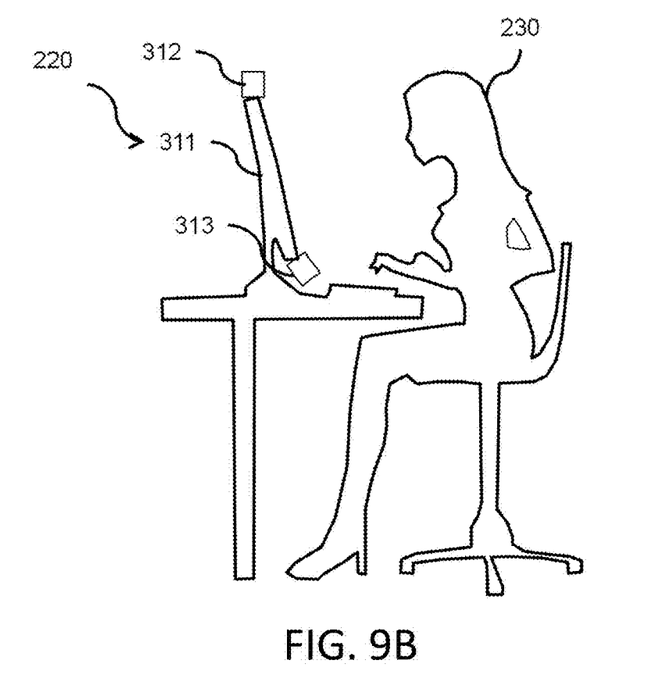
FIG. 9B shows a remote display system according to one or more embodiments.

FIG. 98 shows a remote display system 220 according to one or more embodiments. The remote display system 220 may comprise all or a subset of features of the eye tracking system 10 described in relation to FIG. 1. The remote display system 220 typically comprises a remote 3D display 311, as described in relation to FIG. 9A. The 3D display 311 is remote in the sense that it is not located in the immediate vicinity of the user 230. The remote display system 220 is typically further configured to provide a gaze tracking signal using one or more eye image sensors 312, 313, e.g., indicative of a gaze point and/or a convergence distance. In other words, the remote display system 220 is configured to provide an indication of an object the user 230 is looking at and/or a depth at which the user is looking/watching. As can be seen from FIG. 9B, the remote 3D display 311 does not require stereo/stereoscopic goggles or stereo/stereoscopic head-mounted displays. In a further example, the 3D display is a remote display, where stereoscopic glasses are needed to visualize the 3D effect to the user.

The invention claimed is:

1. An eye tracking system for determining reference gaze data of a user in a scene exposing a pupil of the user, the scene comprising at least a first region having a first luminance level and a second region having a second luminance level differing from the first luminance level by more than a luminance level threshold, the eye tracking system comprising processing circuitry configured to:
    obtain a first eye image comprising the pupil of the user, the first eye image being captured during a first time period;
    determine, based on the first eye image, a first pupil size;
    obtain a second eye image comprising the pupil of the user, the second eye image being captured during a second time period;
    determine, based on the second eye image, a second pupil size;
    obtain scene information of the scene exposing the pupil of the user, the scene information comprising at least the first luminance level, the second luminance level and spatial information indicating a position of the second region during the second time period;
    determine a pupil size change between the first pupil size and the second pupil size, the pupil size change indicating that the user is looking at the second region;
    determine reference gaze data of the user during the second time period, if the pupil size change is larger than a pupil size change threshold, wherein the reference gaze data comprises at least one of a gaze point or a gaze ray indicating where the user is looking; and
    link the reference gaze data to the second region based on the spatial information of the second region to confirm that the user is looking at the second region.

2. The eye tracking system according to claim 1, the processing circuitry further being configured to:
    obtain a position of the pupil during the second time period;
    and wherein the determining of reference gaze data of the user is at least partly based on the obtained position of the pupil.

3. The eye tracking system according to claim 2, wherein the obtaining of the position of the pupil is at least partly based on the position of the pupil in the second eye image.

4. The eye tracking system according to claim 1, wherein the determining of reference gaze data of the user is at least partly based on the obtained scene information.

5. The eye tracking system according to claim 1, the processing circuitry further being configured to:
    determine a distance difference between the reference gaze data and the spatial information of the second region; and
    send an error signal to the user if the distance difference is above an error threshold.

6. The eye tracking system according to claim 1, the processing circuitry further being configured to:
    update a gaze calibration setting of the user, based on the reference gaze data and the scene information.

7. The eye tracking system according to claim 6, wherein the reference gaze data comprises a gaze convergence depth, wherein the spatial information of the second region comprises depth information and wherein the updating of the gaze calibration setting of the user further comprises:
    updating the gaze convergence depth of the user based on the depth information.

8. The eye tracking system according to claim 1, the processing circuitry further being configured to:
    obtain a first total light level exposing the pupil of the user during the first time period;
    obtain a second total light level exposing the pupil of the user during the second time period;
    determine a total light level change between the first total light level and the second total light level; and
    only determine reference gaze data if the total light level change is smaller than a total light level change threshold.

9. The eye tracking system according to claim 1, the processing circuitry further being configured to:
    obtain a first scene image exposing the pupil of the user during the first time period;
    obtain a second scene image exposing the pupil of the user during the second time period;
    determine a scene change between the first scene image and the second scene image; and
    only determine reference gaze data of the user if the scene change is smaller than a scene change threshold.

10. The eye tracking system according to claim 1, the processing circuitry being further configured to:
    determine, based on the first eye image, a first pupil position;
    determine, based on the second eye image, a second pupil position;

determine a pupil position change between the first pupil position and the second pupil position; and
only determine reference gaze data of the user if the pupil position change is larger than a pupil position change threshold.

11. The eye tracking system according to claim 1, wherein the reference gaze data comprises at least one of a gaze point and a gaze ray.

12. The eye tracking system according to claim 1, the eye tracking system further comprising a display arranged to display at least a part of the scene exposing the pupil of the user.

13. The eye tracking system according to claim 1, the eye tracking system further comprising an outward facing scene sensor arranged to obtain at least a part of the scene exposing the pupil of the user.

14. The eye tracking system according to claim 1, the eye tracking system further comprising an eye image sensor arranged to capture the first eye image and the second eye image.

15. The eye tracking system according to claim 14, the eye tracking system further comprising at least one illuminator, wherein each illuminator is arranged to cause a glint in the eye of the user, the glint being detectable in the second eye image, wherein the determining of reference gaze data of the user is at least partly based on a position of the at least one glint in relation to the position of the pupil.

16. A head-mounted device comprising an eye-tracking system for determining reference gaze data of a user in a scene exposing a pupil of the user, the scene comprising at least a first region having a first luminance level and a second region having a second luminance level differing from the first luminance level by more than a luminance level threshold, the eye tracking system comprising processing circuitry configured to:
obtain a first eye image comprising the pupil of the user, the first eye image being captured during a first time period;
determine, based on the first eye image, a first pupil size;
obtain a second eye image comprising the pupil of the user, the second eye image being captured during a second time period;
determine, based on the second eye image, a second pupil size;
obtain scene information of the scene exposing the pupil of the user, the scene information comprising at least the first luminance level, the second luminance level and spatial information indicating a position of the second region during the second time period;
determine a pupil size change between the first pupil size and the second pupil size, the pupil size change indicating that the user is looking at the second region;
determine reference gaze data of the user during the second time period, if the pupil size change is larger than a pupil size change threshold, wherein the reference gaze data comprises at least one of a gaze point or a gaze ray indicating where the user is looking; and
link the reference gaze data to the second region based on the spatial information of the second region to confirm that the user is looking at the second region.

17. A method, performed by an eye tracking system, for determining reference gaze data of a user in a scene exposing a pupil of the user, the scene comprising at least a first region having a first luminance level and a second region having a second luminance level differing from the first luminance level by more than a luminance level threshold, the method comprising the steps of:
obtaining a first eye image comprising the pupil of the user, the first eye image being captured during a first time period;
determining, based on the first eye image, a first pupil size;
obtaining a second eye image comprising the pupil of the user, the second eye image being captured during a second time period;
determining, based on the second eye image, a second pupil size;
obtaining scene information of the scene exposing the pupil of the user, the scene information comprising at least the first luminance level, the second luminance level and spatial information indicating a position of the second region during the second time period;
determining a pupil size change between the first pupil size and the second pupil size, the pupil size change indicating that the user is looking at the second region;
determining reference gaze data of the user during the second time period, if the pupil size change is larger than a pupil size change threshold, wherein the reference gaze data comprises at least one of a gaze point or a gaze ray indicating where the user is looking; and
link the reference gaze data to the second region based on the spatial information of the second region to confirm that the user is looking at the second region.

18. A non-transitory computer-readable storage medium storing instructions which, when executed by a computer, cause the computer to carry out the steps of:
obtaining a first eye image comprising a pupil of a user, the first eye image being captured during a first time period;
determining, based on the first eye image, a first pupil size;
obtaining a second eye image comprising the pupil of the user, the second eye image being captured during a second time period;
determining, based on the second eye image, a second pupil size;
obtaining scene information of the scene exposing the pupil of the user, the scene information comprising at least a first luminance level, a second luminance level and spatial information indicating a position of a second region during the second time period;
determining a pupil size change between the first pupil size and the second pupil size, the pupil size change indicating that the user is looking at the second region;
determining reference gaze data of the user during the second time period, if the pupil size change is larger than a pupil size change threshold, wherein the reference gaze data comprises at least one of a gaze point or a gaze ray indicating where the user is looking; and
link the reference gaze data to the second region based on the spatial information of the second region to confirm that the user is looking at the second region.

19. The non-transitory computer-readable storage medium of claim 18, the steps further comprising:
obtaining a position of the pupil during the second time period, wherein the determining of reference gaze data of the user is at least partly based on the obtained position of the pupil.

* * * * *